Nov. 9, 1954     L. E. MYLTING     2,693,761
AXIAL ADJUSTMENT FOR PUMP BEARINGS
Filed Aug. 24, 1949
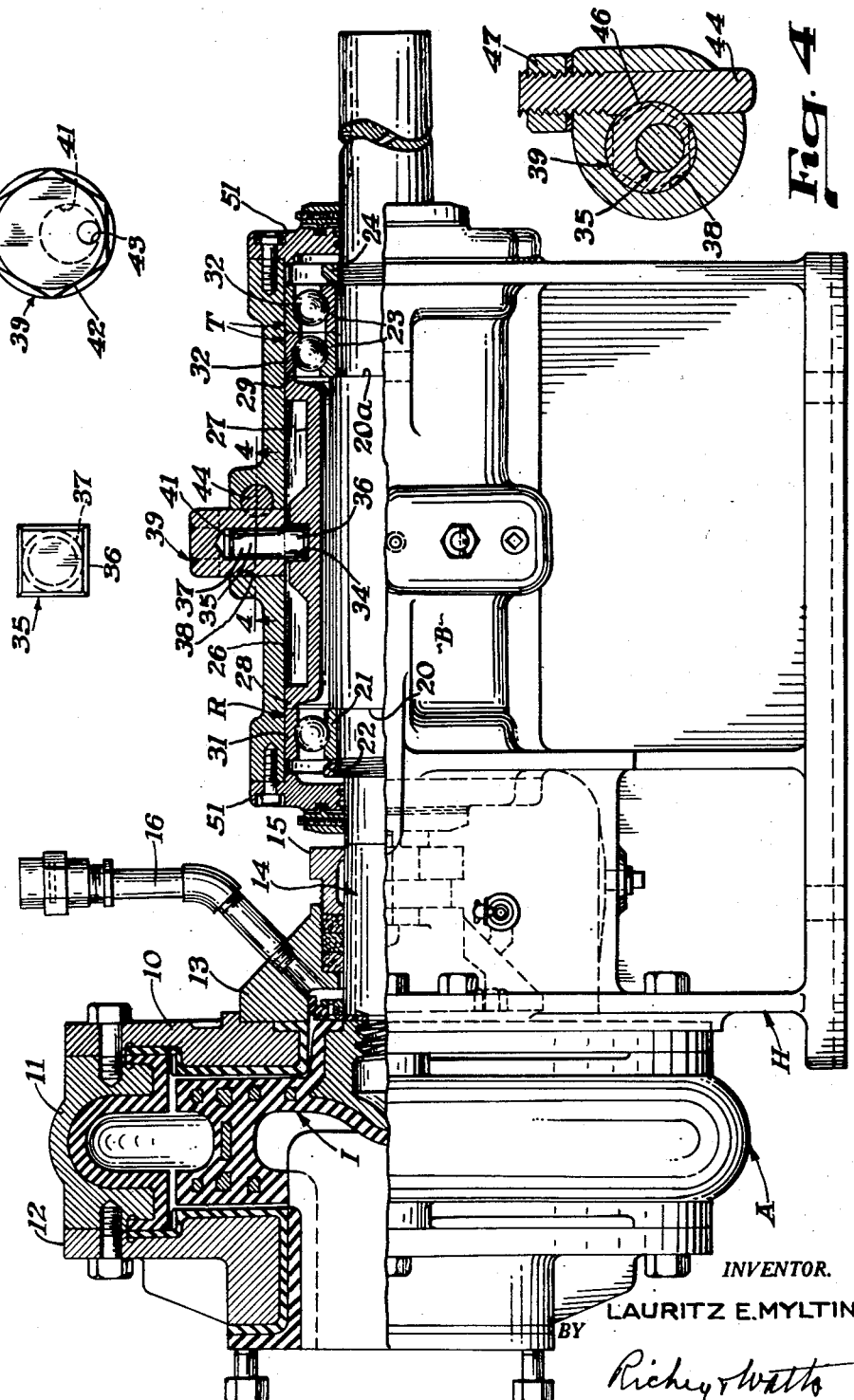
INVENTOR.
LAURITZ E. MYLTING.
BY
Richey & Watts
ATTORNEYS.

United States Patent Office 2,693,761
Patented Nov. 9, 1954

2,693,761

AXIAL ADJUSTMENT FOR PUMP BEARINGS

Lauritz E. Mylting, Merchantville, N. J., assignor to The Allen-Sherman-Hoff Company, Philadelphia, Pa., a corporation of Pennsylvania Application August 24, 1949, Serial No. 112,008

4 Claims. (Cl. 103—111)

This invention relates to centrifugal pumps, and more particularly to centrifugal pumps embodying means for adjusting and maintaining the proper clearance between the side walls of the impeller and its housing.

During the operation of centrifugal pumps it is important that the impeller be accurately located in its housing to avoid frictional contact between the impeller and the housing. If the bearing or other assembly that locates the impeller in an axial direction fails to function properly because of wear, maladjustment, distortion, or the like the impeller will approach one side or the other of the housing causing damage to the parts at that zone. Even if the impeller does not touch the casing but merely comes appreciably closer to one side thereof than to the other, if the machine is pumping liquids containing an abrasive, excessive wear will occur at the zone where the clearance has been permitted to become too small. Also, the increased space between the other side of the impeller and the housing reduces the efficiency of the pump. Not only has difficulty been encountered in connection with maintaining the aforesaid clearance, but furthermore extremely accurate machining and highly-skilled assembly and installation is required to attain the desired positioning of the impeller initially.

The principal object of the present invention resides in the provision of a pump embodying apparatus which facilitates the initial setting and adjustment of the impeller within its housing to produce the desired side clearances, which apparatus will maintain those clearances during operation of the pump regardless of the deleterious effects of heavy loads, vibration and the like. Briefly, these results are obtained by incorporating in the pump housing an adjustable bearing structure for mounting the impeller. The structure includes axially-spaced ball bearings having their inner races clamped to their shaft and their outer races slidable in a bore in the housing. An axially adjustable spacer extends between the outer races and its moved by adjusting means reacting between the housing and the spacer.

With this construction there is virtually no wear in the bearing assembly so that once an adjustment is effected, it will remain unchanged. Furthermore, the construction facilitates the installation of the proper bearings designed to carry the radial and axial loads encountered. For example, in a preferred arrangement, the inboard bearing (that is, the bearing nearest the pump impeller) is of the radial type that takes thrust in both directions, which accurately locates the impeller radially, and is intended to prevent shaft movement outwardly from the pump. The outboard ball bearing assembly includes ball bearings of the radial type designed to take high thrust loads in one direction and disposed to withstand the axial load on the shaft caused by the reaction of fluid pumped through the housing, which load tends to move the shaft toward the pump. With this arrangement the bearings are arranged for maximum effectiveness, clearances are non-existent or remain at any predetermined value, and there is no wear to increase the clearances.

Another feature of the invention resides in the provision of simple and effective adjusting means for that assembly which can be relied upon to give precise, finely-graduated adjustments and which will not be distorted or worn during operation of the pump and its adjusting means. This is accomplished by providing in the bearing spacer a recess having axially-spaced, parallel walls. Rotatably mounted in the housing is a radially-disposed plug having an eccentric bore for reception of the shank of a pin. The pin is formed with a head portion having parallel side walls that snugly fit and enage the side walls of the recess in the bearing spacer. With this construction rotation of the plug axially adjusts the impeller shaft and when the plug is locked in its adjusted position the shaft remains in its adjusted position. With the construction just described there is a generous area of contact between all parts of the adjusting device, and the parts are readily machined by simple drilling and milling operations, yet a precise adjustment is obtained by rotation of the eccentrically-bored plug.

The manner in which these and other objects and advantages may be accomplished in practice will be apparent from the following detailed description of a preferred embodiment of the invention.

In the drawings:

Fig. 1 is a partial section through a pump embodying the invention;

Fig. 2 is an enlarged bottom view of the adjusting pin;

Fig. 3 is a plan view of the adjusting plug; and

Fig. 4 is a section through the adjusting plug taken on 4—4 of Fig. 1.

The pump assembly, as shown in Fig. 1, includes several major elements, one being the housing H which has a pump section or casing A and a shaft housing or bearing section B. The pump section or casing of the housing includes an inboard side plate 10, an annular housing member 11, and an outboard side plate 12, which cooperate to form a chamber which receives a centrifugal-type impeller I. Details of the construction of the impeller and housing form no part of the invention and a pump and casing assembly to which the invention may be applied is described in the patent to F. B. Allen, 2,206,669. The shaft housing includes section 13 that receives the impeller shaft 14 and has mounted therein suitable packing compressed by the usual gland 15. Where the pump is used to pump liquids containing abrasives a water-type seal arrangement indicated generally by the water inlet pipe 16 and described in detail in the patent to F. B. Allen, 2,003,168, may be employed, it being understood that the sealing means is not critical to the invention.

Mounted within the shaft housing or bearing section B of the main housing is an adjustable assembly for maintaining the desired clearance between the side walls of the impeller and its casing. Oppositely-facing shoulder means 20 and 20a are formed on the shaft 14 and the inboard shoulder 20 is engaged by the inner race 21 of a radial-type ball bearing R, the race being held firmly in position by a clamping nut 22. At the outboard portion of the bearing assembly, a pair of inner races 23 of two thrust bearings T are held against the shoulder 20a by a clamping nut 24.

In order to provide for axial adjustment of the impeller shaft and associated impeller, the shaft housing section B is formed with a cylindrical bore 26 in which is slidably mounted a bearing spacer member 27 having end portions 28 and 29 for engaging respectively the outer races 31 and 32 of the ball bearings R and T. The relative distance between ends 28 and 29 of the spacing member 27 and the distance between the outer races of the bearings may be varied by the designer from a construction wherein the bearings are preloaded to provide a very precisely located impeller to a construction wherein there is a predetermined clearance to allow for thermal expansion or other slight predetermined free motion of the impeller shaft.

Adjustable means are provided for axially shifting the impeller shaft and the impeller which, in accordance with the invention, include a recess 34 formed externally in the spacer 27 and having axially-spaced, parallel side walls. An adjusting pin 35 is provided and has a head portion 36 preferably square in outline and snugly engaging the side walls of the recess in the spacer. The adjusting pin also has a cylindrical shank portion 37. A radial bore 38 is formed in the housing wall in the zone of the recess 34 and rotatably receives a plug 39, snugly fitting the bore 38. An eccentric blind bore 41 is formed in the plug which snugly and slidably receives the shank 37 of the pin. Flats 42 are formed on the plug to facilitate rotation thereof with a wrench, and an indicator mark 43 is machined on the plug to give visual indication of the rotation thereof. The plug is frictionally retained in its housing and clamped in its adjusted position by means of a pin 44 mounted in the housing and having a circular notch 46 that engages a portion of the periphery of plug 39. The pin is threaded at one end to receive a clamp nut 47, which when tightened firmly clamps plug 39 in its adjusted position. Suitable end caps 51 embodying dust seals for the shaft close off and protect the working parts of the bearing assembly.

To adjust the bearing, nut 47 is loosened and a wrench is applied to the plug 39, which is adjusted until the desired clearance between the impeller and its casing is obtained. Whereupon, the plug is locked in place and the selected clearance will be maintained indefinitely. It is noted that all axial forces are transmitted through the ball bearing races and the balls so that there is virtually no wear of the parts, so that once the adjustment is made it will not change. The generous bearing areas between the squared head of the pin 35 and the recess 34 and between the shank 37 of the pin and the bore 41, and between the plug and the bore 38 in the housing all insure that there will be virtually no wear, looseness, sloppiness, or distortion of these parts due to vibration, shock loads, or the like encountered in the operation of the pump. The machining operations required to produce the adjusting plug and pin members are extremely simple and yet precise adjustment can be effected, the sensitiveness of which can be selected by variation in the eccentricity of the bore 41 with the circumference of the plug.

The radial-type bearing R, being located closest to the impeller, effectively assists in reducing whipping of the shaft and insures radial alignment of the impeller in its casing. The radial-type thrust bearings T are as effective to withstand the thrust loads when located at the outboard end of the shaft as they would be were they located closer to the impeller so that the construction has the advantage that both types of bearings are arranged for maximum effectiveness. The construction is also readily assembled and slight variations in the fit of the parts can be readily corrected by a simple adjustment of the plug 39.

Having completed a detailed description of a preferred form of the invention so that others skilled in the art may be able to understand and practice the same, I state that what I desire to secure by Letters Patent is defined in what is claimed.

What is claimed is:

1. For use with a pump having a casing and an impeller; an impeller shaft, a fixed shaft housing, means for adjusting the clearance between the impeller and casing, comprising a pair of axially-spaced abutments on said shaft, anti-friction thrust bearings having inner races mounted on said shaft and engaging said abutments and outer races slidably mounted in said housing as a sleeve, said outer races engaging the said housing over their full axial lengths and their circumferences, means within the housing and disposed outside said thrust bearings cooperating with said abutments for fixedly positioning the inner bearing races in axially-spaced relation on said shaft, spacing means slidably in said housing and extending between the outer races of opposed bearings, and adjusting means mounted in said housing and engaging said spacing means, said adjusting means being arranged to move said spacing means axially and hence said bearings and shaft in either direction.

2. For use with a pump having a casing and an impeller; an impeller shaft, a fixed shaft housing, means for adjusting the clearance between the impeller and casing, comprising a pair of axially-spaced abutments on said shaft, ball thrust bearings having inner races mounted on said shaft and engaging said abutments and outer races slidably mounted in said housing as a sleeve, said outer races engaging the said housing over their full axial lengths and their circumferences, means within the housing and disposed outside said thrust bearings cooperating with said abutments for firmly positioning the inner bearing races in axially-spaced relation on said shaft, means including dust seals for the shaft closing the ends of the housing, spacing means slidably in said housing and extending between the outer races of opposed bearings, and adjusting means comprising an external recess formed in said spacer, a bore through said housing in the zone of said recess, a plug rotatable in said bore, an eccentric bore in said plug, and a pin having a shank portion fitting in said eccentric bore and a portion snugly fitting in said spacer recess, whereby rotation of said plug axially moves said spacing means and hence said bearings and shaft in either direction.

3. For use with a pump having a casing and an impeller; an impeller shaft, and a fixed shaft housing, means for adjusting the clearance between the impeller and casing, comprising a pair of axially-spaced abutments on said shaft, ball thrust bearings having inner races mounted on said shaft and engaging said abutments and outer races slidably mounted in said housing as a sleeve, said outer races engaging the said housing over their full axial lengths and their circumferences, means within the housing and disposed outside said thrust bearings cooperating with said abutments for firmly positioning the inner bearing races in axially-spaced relation on said shaft, spacing means slidable in said housing and extending between the outer races of opposed bearings, and adjusting means comprising an external recess formed in said spacer having axially-spaced parallel side walls, a bore through said housing in the zone of said recess, a plug rotatable in said bore, an eccentric bore in said plug, and a pin having a shank portion fitting in said eccentric bore and a portion having parallel sides snugly engaging the parallel walls of said spacer recess, whereby rotation of said plug axially moves said spacing means and hence said bearings and shaft in either direction.

4. For use with a pump having a casing and an impeller; an impeller shaft, and a fixed shaft housing, means for adjusting the clearance between the impeller and casing, comprising a pair of axially-spaced abutments on said shaft, ball thrust bearings having inner races mounted on said shaft and engaging said abutments and outer races slidably mounted in said housing as a sleeve, said outer races engaging the said housing over their full axial lengths and their circumferences, means within the housing and disposed outside said thrust bearings cooperating with said abutments for firmly positioning the inner bearing races in axially-spaced relation on said shaft, spacing means slidable in said housing and extending between the outer races of opposed bearings, and adjusting means comprising an external recess formed in said spacer having axially-spaced parallel side walls, a bore through said housing in the zone of said recess, a plug rotatable in said bore, an eccentric bore in said plug, a pin having a shank portion fitting in said eccentric bore and a portion having parallel sides snugly engaging the parallel walls of said spacer recess, whereby rotation of said plug axially moves said spacing means and hence said bearings and shaft in either direction, and means locking said plug in adjusted position.

References Cited in the file of this patent

UNITED STATES PATENTS

| Number | Name | Date |
|---|---|---|
| 681,683 | Deck | Sept. 3, 1901 |
| 1,566,924 | Robertson | Dec. 22, 1925 |
| 2,017,026 | Forrest et al. | Oct. 8, 1935 |
| 2,245,866 | McLachlan | June 17, 1941 |
| 2,298,022 | Ringland | Oct. 6, 1942 |
| 2,381,823 | La Bour | Aug. 7, 1945 |